May 1, 1934.  E. B. BELCHER  1,956,975
PULP MOLDING MACHINE
Filed Jan. 23, 1929  4 Sheets-Sheet 1

INVENTOR
Edward B. Belcher

May 1, 1934.  E. B. BELCHER  1,956,975
PULP MOLDING MACHINE
Filed Jan. 23, 1929   4 Sheets-Sheet 2

INVENTOR
Edward B. Belcher

May 1, 1934.  E. B. BELCHER  1,956,975
PULP MOLDING MACHINE
Filed Jan. 23, 1929    4 Sheets-Sheet 3
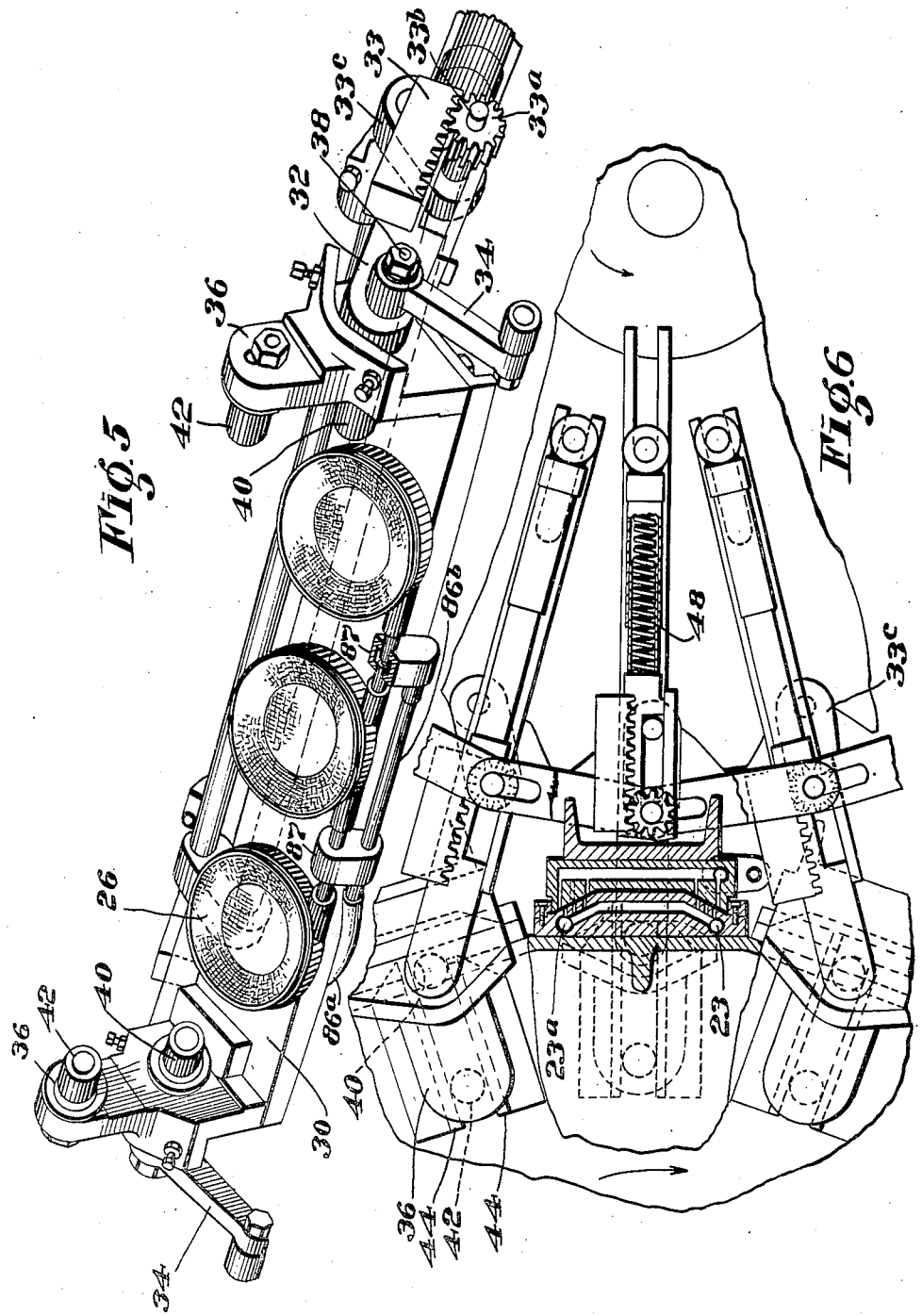
INVENTOR
Edward B. Belcher

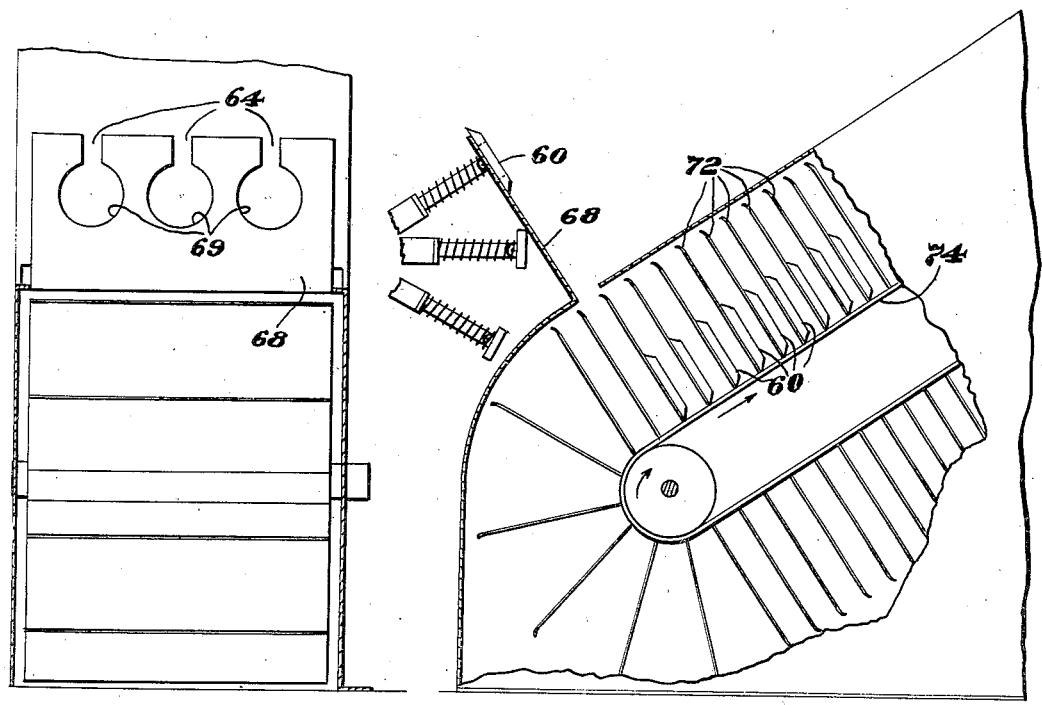
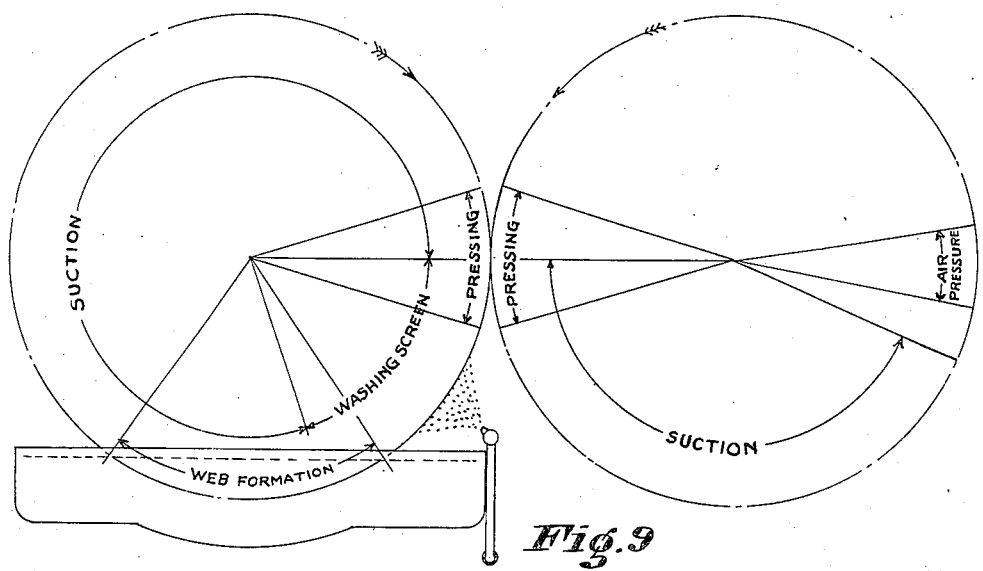

Patented May 1, 1934

1,956,975

UNITED STATES PATENT OFFICE 1,956,975

PULP-MOLDING MACHINE

Edward B. Belcher, Arlington, Mass., assignor, by mesne assignments, to Berst-Forster-Dixfield Co., a corporation of Maine Application January 23, 1929, Serial No. 334,501

11 Claims. (Cl. 92—56)

This invention relates to a pulp-molding machine, and has for its object to provide an improved and more efficient device of this character. It particularly aims to provide a machine adapted for continuous operation and high production. A relatively long suction period or cycle is secured, and without in any way delaying or slowing down the productiveness of the machine. The suction cycle is followed by an efficient pressing operation provided through the medium of improved and novel apparatus by means of which a gradual increase of pressure is secured, and which pressure is easily regulated and uniformly controlled as to amount within any necessary commercial limits.

In the drawings:

Fig. 5 shows in perspective a lateral series of three female molds together with the mounting therefor;

Fig. 6 is a side elevation, partly in section, showing the meshing of the male and female molds;

Fig. 7 shows in elevation the delivery end of the machine and the means for depositing the plates in an endless conveyor, whereby the plates may be passed through a drier;

Fig. 8 shows in plan the stripping plate adapted to strip the molded plates from the revolving sucker arms which take the molded articles from the female molds; and Fig. 9 is a timing diagram showing graphically the cycle of operations of the machine.

Figure 1:
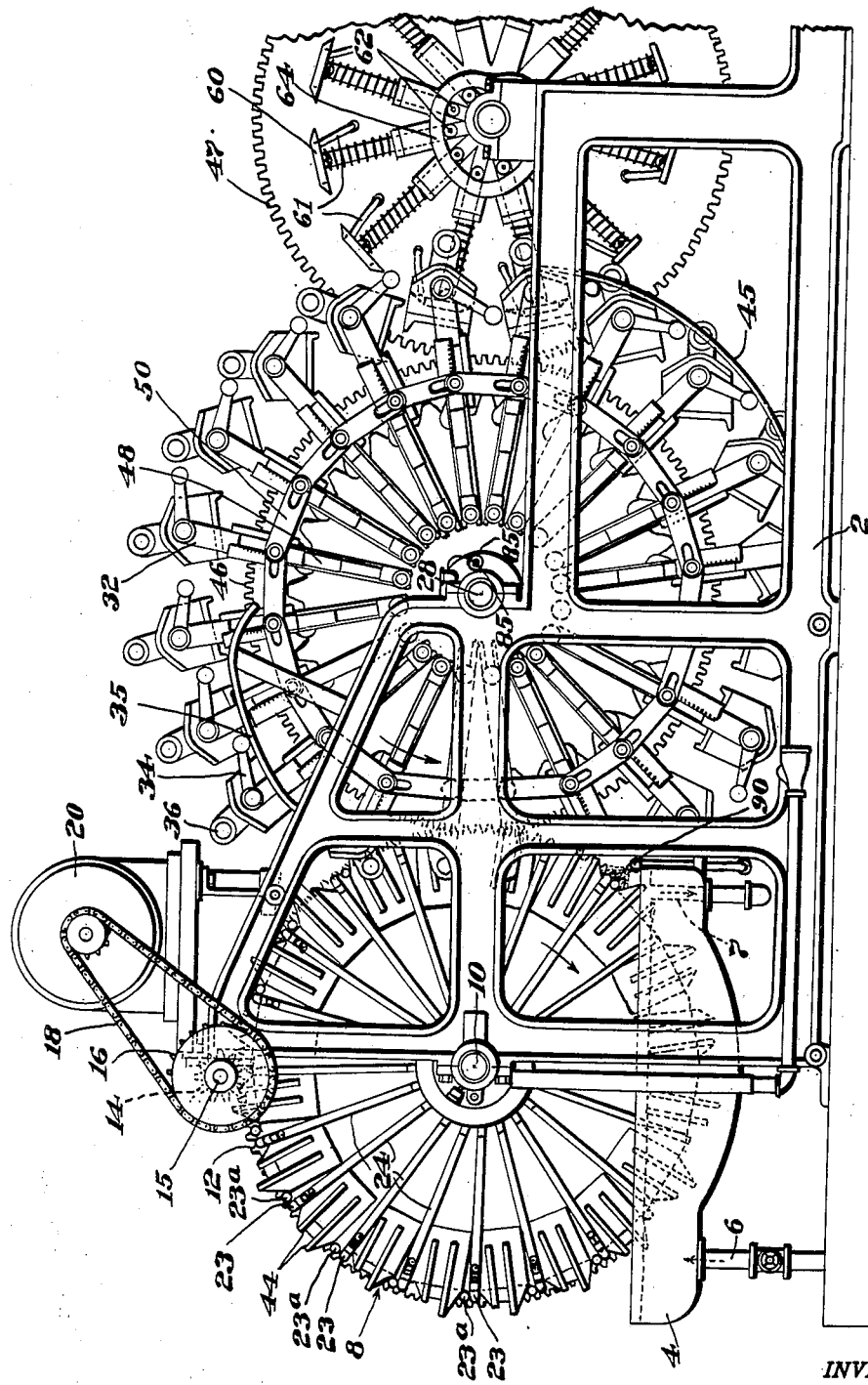
Fig. 1 is a side elevation showing the principal parts of the machine, but with a portion of the delivery end of the same broken away.
Figure 2:
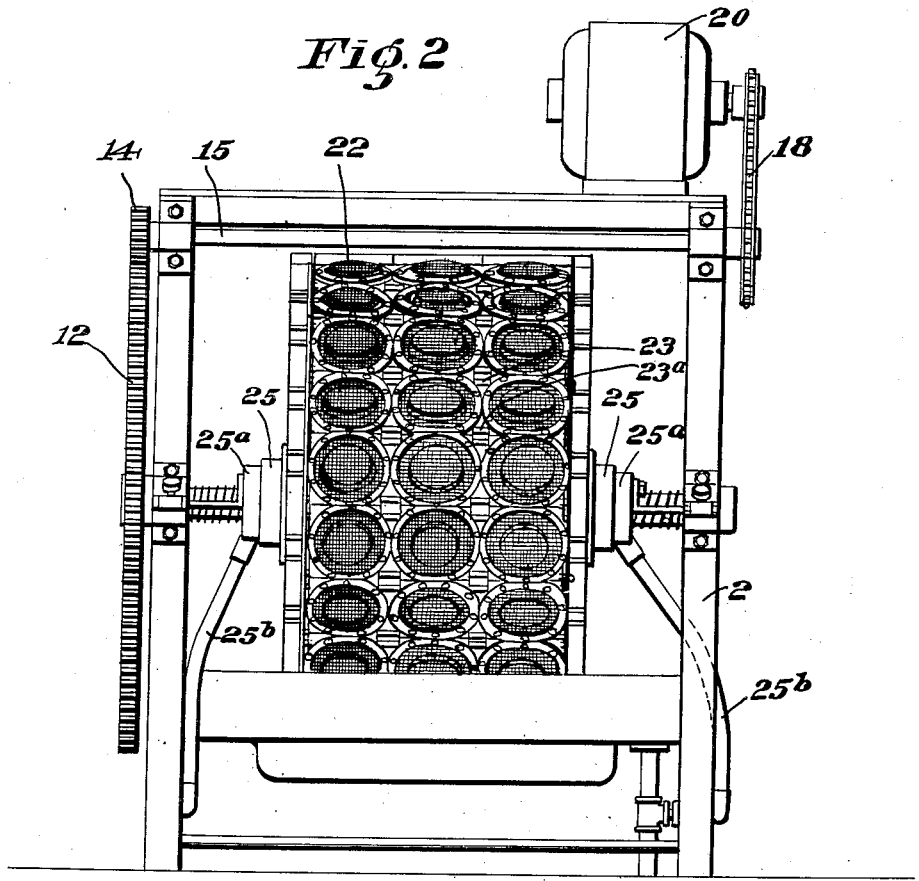
Fig. 2 is an end view of the vat end of the machine.
Figure 3:
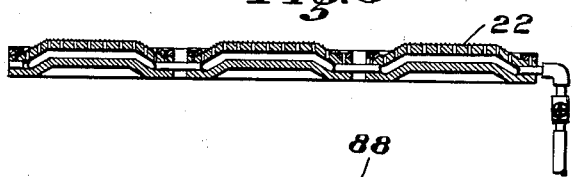
Fig. 3 is a cross-sectional detail of the male molds of the type carried by the rotating drum over the vat.

Referring to the drawings and especially to Figs. 1 and 2, the machine in its essentials includes a frame 2 and a vat 4, in which vat liquid pulp of suitable character is maintained at a constant level by means of a circulating system (not shown), the pulp being passed into the vat through the pipe 6, and maintained at a constant level by means of the pipe 7 which carries away the overflow or excess of pulp. Superimposed over the vat 4 and carried in the frame 2 is a drum or cylindrical member generally designated at 8, which is suitably mounted so as to be continuously revolved by the shaft 10, as the drum is driven through the medium of the gear 12 from the pinion 14 affixed to the shaft 15 which is driven by means of the gear 16, chain 18 and motor 20, as clearly shown in Figs. 1 and 2. The revolving mold carrier or drum 8 carries upon its outer surface a series of male molds 22 (see Figs. 2 and 3) of a type similar to those well known and used in the art, consisting essentially of a perforated member carrying upon its surface a suitable screen, adapted to receive a layer or web of pulp and at the same time allow the water to be extracted therethrough. The molds 22, as can be seen from Fig. 2, are arranged in separate transverse series connected by two separate transverse suction lines 23 and 23a (23 on the leading side and 23a on the following side of each transverse series of molds) so that the water can always drain from the molds by gravitation in one of the two suction lines while suction is being exerted. Each suction line is connected to a suction pipe or hose 24 leading to a revolving hub member 25, through which suction is exerted at the proper time upon the back side of each mold 22, thus providing a means for causing the pulp to more readily adhere to the external surfaces of the molds 22, when the latter are immersed in the vat 4. The suction lines 23 on the leading sides of the molds are connected to one hub member 25 and the suction lines 23a on the following sides of the molds are connected to the other hub member 25. The suction is secured and timed through the revolving and fixed hub members 25 and 25a connected to the suction pipes 25b leading to an exhausting pump (not shown), as well known in the art, so as to begin when each transverse series of molds 22 enters the vat 4 and continues through an angle of substantially 290° until each transverse series of molds is horizontally opposite the axle 10, at which time the suction is released as the molded articles are transferred from the male to the female molds.

Thus it will be seen that each transverse series of molds is adapted to form simultaneously a plurality of separate articles, a marked advantage in a machine from which a high production is desired.

A series of female molds 26 is carried as an assembly and revolves with an axle 28, each transverse or lateral series of female molds being held upon a rocking bar 30, as clearly shown in Figs. 1 and 5. The bars 30 are individually and separately controlled by means presently to be described, so as to cause each bar to be turned or rocked and to present its series of female molds to a companion or mating series of male molds upon the drum 8. Thus there is provided means for compressing the wet pulp formed by the companion molds on the drum 8. As shown in Figs. 1 and 5, each bar 30 is povotally mounted between the outer ends of the push rods 32, and is free to be turned between the ends of its two push rods 32 by means of the crank 34 or the crank 36 as either of the latter is engaged. The cranks 36 also provide a means for attaching the bar to the shafts 38, which pass through the ends of the push rods 32, the inner end of the shafts 38 carrying thereon, concentric therewith, a roller 40, about the center of which the bars oscillate as moved by the cranks 34 or 36. At the outer ends of the cranks 36 are mounted rollers 42, which co-act with the rollers 40 in the slides 44 on the drum 8 so as to cause each series of female molds to be pressed inwardly and radially with respect to the drum 8, always moving in the same direction with reference to the drum 8 while the rollers 40 and 42 are within the control of the slides 44. As will be seen from Fig. 1, the assembly of female molds is attached together and revolved from the gear 12 through the medium of the gear 46 meshing therewith, and as this assembly revolves each pair of rollers 42 is successively engaged by the slides 44 as each bar 30 is tipped in turn by the cranks 34 on the cam surface 35 (see Fig. 1), so that as the rollers 42 on the cranks 36 are caught by the longer of the pair of parallel slides 44, said rollers 42 enter the openings between the slides and are followed by the inner rollers 40, the bar with its molds thus passing into the directional control of the slides 44 on the drum 8. As the drums revolve, the female molds are pressed outwardly with respect to the revolving assembly of female molds, and inwardly with respect to the drum 8, by reason of springs 48, which urge each push rod outwardly as far as the links 50 permit. The slots in the links 50 are so designed as to permit the desired amount of radial movement and still preserve the rollers 42 so held that they may be readily engaged by the slides 44 as they tend to approach one another upon the upper flights of the male and female molds. The two push rods 32 affixed to each rocking bar 30 are equalized in their outward movements by means of the racks 33 carried thereby. These racks mesh with gears 33a affixed to and carried by the shafts 33b, such shafts being suitably held to the revolving assembly by the pivotally mounted links 33c.

Figure 4:
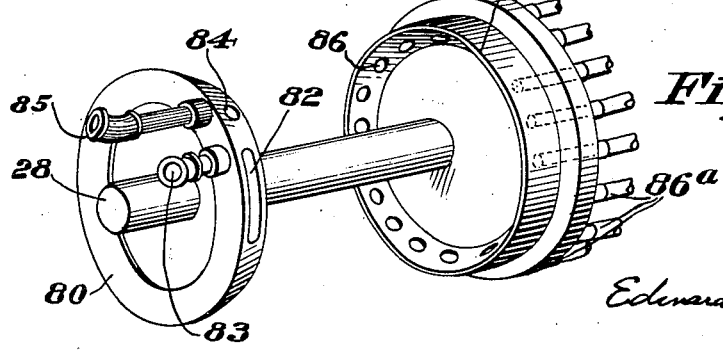
Fig. 4 is a perspective view showing the pneumatic control arrangement for providing suction and pressure to the series of rotating female molds.

By reference to the timing diagram, Fig. 9, the cycle of operations will be understood and from it will be apparent the relative period of time that each action is continued, that is, each respective lateral series of molds carried by the drum 8 is subject to a suction of approximately 290° of rotation, during which rotation the product is felted or formed and a large part of the water extracted. Some 15° or 20° before the end of such suction cycle the pressing of the felted articles on the male molds by the female molds begins, shortly followed by a suction on the female molds which may continue, for example, for approximately 150° of rotation (but in the meantime as the mating molds reach dead center the suction on the male molds is released), then follows a release of the suction during a short turn of the assembly, and then finally air pressure, by means of which the molded articles are carried away successively from each lateral series of female molds by means hereinafter described. The suction is timed with respect to the drum 8 by ported fixed and moving members, as well known in the art, essentially similar in type to the means employed for providing and timing the suction for the female molds (see Fig. 4), hereinafter described. Referring to the revolving assembly of female molds, the suction and pressure is applied thereto by means of the fixed member 80 through which the shaft 28 passes. This member 80 has cored therein two passages connected respectively to suction and pressure lines, the passage 82 being connected to the suction line 83 and the passage 84 being connected to the pressure line 85. Suction or pressure, as required, is successively imparted to the pipes 86a leading to each respective transverse series of female molds through the apertures 86 in the internal frusto-conical face of the member 88 which is finished so as to closely fit the exterior of the frusto-conical rotating member 80.

Each of the pipes 86a is connected to a transverse series of female molds through the medium of a manifold 86b and liquid traps 87. The traps 87 are for the purpose of preventing liquid from being blown backwardly and through the mold face, so as to injure the molded articles, when air pressure is applied to remove such articles from the faces of the female molds. Fig. 5 shows a series of female molds on the descending side of their flight from which the pipe 86a leads away from the lower side of the molds from the manifold 86b connected to the traps 87 one of which is broken away to show its construction. When in this portion of their travel the pipe 86a carries away any water exhausted from the mold faces, but when the molds near the bottom of their flight the traps then begin to function so as to retain any liquid thereafter exhausted and prevent its being blown back through the mold faces when the pressure is imparted to the molds, the water thus trapped being exhausted upon the next descent of the molds when the suction again occurs.

Following the transfer of the molded articles from the male molds I preferably subject such molds to a cleansing by water from a shower device 90 (shown in Figs. 1 and 9) which is so placed and directed that the waste water therefrom falls into the vat 4.

The molded articles are carried away from the female molds by an assembly of revolving sucker heads to which a revolving motion is given by the gear 46 on the revolving mold assembly through the gear 47 driving the sucker head assembly. The sucker heads 60, revolving about a horizontal axis, are carried on spring pressed radial arms, which urge the sucker heads outwardly, limited by the pins 62, which pins travel around, within, and in contact with a fixed internal cam 64. Each transverse series of sucker heads is thus controlled so as to come in contact with a transverse series of female molds guided and properly faced with respect to the sucker heads by the cam track 45. Upon a suction being imparted to the sucker heads through suction lines 65 connected to the usual type of suction timing device (not shown) and to a main source of suction, and upon air pressure being admitted to the female molds, a transverse series of molded articles is removed by the sucker heads and carried away by them.

Referring to Figs. 7 and 8, it will be seen from

Fig. 7 that as each transverse series of sucker arms 60 approaches a position opposite the revolving assembly of female molds, the arms enter the slots 66 of the stripper plate 68 shown in elevation in Fig. 7, the molded pulp articles, for example, the paper plates here shown being carried above and deposited upon the upper surface of the stripper plate 68. Then the suction upon the sucker arms 60 is released and each series of sucker arms is drawn inwardly by reason of the action of the pins 62 on the inside of the cam 64 so as to cause the sucker arm 60 to leave the plates on the upper surface of the stripper plate 68 as each transverse series of the sucker arms 60 withdraws radially and inwardly to pass downwardly through the enlargements 60 and thence beneath the stripper plate 68. The molded articles thus deposited upon the upper surface of the stripper plate 68 slide downwardly and between wire racks 72 carried by an endless belt 74 in the heated drier 73 from which the dried plates are discharged as the racks 72 are passed over the pulley at the opposite end of their travel and enter upon their lower or return flight.

It is not, of course, essential that the molded articles be transferred from the female molds by a sucker device (as shown) and they may, for example, be directly transferred from the female molds to a conveying device.

It will be understood that while I have herein shown and described the best embodiment of the invention of which I am at present aware, this embodiment may be modified in many particulars without departing from the spirit or scope of this invention.

What is claimed as new is:—

1. In a pulp-molding machine having a mold face which repeatedly travels through a path of revolution, the combination therewith of a second travelling mold face adapted to coact with said revolving face through a substantial length of arc of travel, to compress pulp between the faces; a pivot revolving with said mold, on which pivot the said mold is mounted; a fixed abutment, at a location adjacent to where said mold faces are moving toward each other; means on the revolving mold to engage said abutment as the molds come together, for turning the revolving mold face about its pivot; guiding means on one mold; and means guided thereby on the other mold for turning the revolving mold face about its pivot; the said abutment and its engaging means turning the pivoted mold to bring said guiding and guided means into interacting relation; and the said guiding and guided means, by their interaction, continuing the turning of the pivoted mold prior to the compressing coaction of the two mold faces, and controlling parallelism of those mold faces during their period of coaction.

2. In a pulp-molding machine having two independent travelling mold faces, and mounting means therefor whereby one of them repeatedly travels through a path of revolution, and the other of them compressively coacts with the first, in the course of each revolution; the mounting means for the revolving mold including a pivotal support for that mold; an abutment fixed adjacent to the orbital path of the revolving mold; means on said revolving mold to engage said abutment as the molds come together, for turning the revolving mold about its said pivot, to align the mold faces; and means on each mold, mutually interacting for controlling the mutual relations of the mold faces, as regards parallelism, as they come together and during their compressing coaction; the said abutment and its engaging means being adapted to adjust its mold face for the attaining of said interaction.

3. A pulp-molding machine comprising two continually rotating mold carrying devices, arranged adjacent to each other on parallel axes, rotating in opposite directions, and adapted for a mold of one said device to engage compressively a mold of the other said device during rotation; and means on each of said devices, in addition to said molds, arranged and adapted to mesh, one with the other, for shifting the position of one of the two said molds relative to the other prior to their said compressive engagement.

4. A pulp-molding machine comprising two continually rotating mold carrying devices, arranged adjacent to each other on parallel axes, rotating in opposite directions, and adapted for a mold of one said device to engage compressively a mold of the other said device during rotation; said molds being arranged in gangs of molds aligned parallel to the axes of rotation; a radially slidable support on one of the carriers for the gang of molds thereon; means yieldingly urging said support radially outward; and a rack and pinion at each end of said slidable support for equalizing the movements of the ends of the gang, the racks being on the gang support, and the pinions being on the carrier, and there being on the carrier a shaft parallel to the axis, on which shaft said pinions are fast.

5. A pulp-molding machine comprising, in combination, a revolving, perforate mold face, and means for exerting suction at said mold face, including a chamber back of said mold face and a conduit connected thereto at its leading side, for suction and drainage, and a conduit connected to said chamber at its following side for suction and drainage, whereby at substantially every location along the path of revolution, one or the other of said conduits is in position for water to flow to it by gravity from the wall of said chamber which is constituted by said mold face.

6. A pulp-molding machine comprising, in combination, a revolving, perforate mold face, and suction means, effective at said mold face, adapted to form a layer of pulp thereon and to maintain continuous suction on said pulp through approximately three-fourths of the orbit of said mold face; said means including a chamber back of said mold face and a conduit connected thereto at its leading side for suction and drainage, and a conduit connected to said chamber at its following side for suction and drainage, whereby, at both upward and downward parts of the path of revolution of the mold face, there is a conduit in position for water to enter by gravity from the back of the mold face.

7. A pulp-molding machine comprising, in combination, a revolving chamber with perforate mold face, and means for exerting suction at said mold face, including two relatively small conduits connected into the chamber, one leading and one following said face, and both serving for suction and drainage of water; the said smallness of conduit being such that slugs of water filling the cross-section of conduit, are sucked along the conduit.

8. In a pulp-molding machine having a vat for containing the pulp supply, a continually rotating mold carrier, arranged for its molds to dip into said vat in succession, and said molds, adapted for each to pick up a layer of pulp on its face, and having means for compressing said pulp on said faces and for removing the compressed product; and having water applying means for said faces prior to their return to the vat; the combination in which said elements are arranged for the cleaning water to flow to the vat after impinging upon the mold faces.

9. In a pulp-molding machine having a revolving mold face, and a second mold face adapted to coact with said revolving face to compress pulp between them, the combination therewith of a rack conveyor of which each rack is adapted to support a molded article standing on edge therein; an inclined guide with its lower end closely adjacent to the path of travel of the entrances to said racks; and means for transferring the molded article from one of said mold faces to said inclined guide, whereon by gravity it can slide gently into one of said racks.

10. In a pulp-molding machine having a revolving mold face, and a second mold face adapted to coact with said revolving face to compress pulp between them, the combination therewith, of pick-off means for removing the molded article from its carrier; a conveyor; and a stripper, arranged to strip the molded article from said pick-off means and having an inclined slide leading to said conveyor, for said molded article to slide down the incline and gently deposit and position itself on said conveyor.

11. In a pulp-molding machine having a revolving mold face and a second mold face adapted to coact with said revolving face to compress pulp between them, the combination therewith of a conveyor; an inclined guide leading to said conveyor; and means for transferring the molded article from one of said mold faces to said inclined guide, whereon by gravity it can slide gently onto said conveyor.

EDWARD B. BELCHER.